United States Patent [19]

Mijiyawa

[11] Patent Number: 4,760,445

[45] Date of Patent: Jul. 26, 1988

[54] IMAGE-PROCESSING DEVICE FOR ESTIMATING THE MOTION OF OBJECTS SITUATED IN SAID IMAGE

[75] Inventor: Mékano Mijiyawa, Paris, France

[73] Assignee: U.S. Philips Corporation, New York, N.Y.

[21] Appl. No.: 36,221

[22] Filed: Apr. 9, 1987

[30] Foreign Application Priority Data

Apr. 15, 1986 [FR] France ................ 86 05348

[51] Int. Cl.$^4$ ............................................. H04N 7/137
[52] U.S. Cl. .................................... 358/105; 358/135; 358/136; 375/27
[58] Field of Search ............... 358/135, 136, 133, 138, 358/105; 375/27

[56] References Cited

U.S. PATENT DOCUMENTS 4,232,400 11/1980 Yamamoto .......................... 358/167
4,307,420 12/1981 Ninomiya ........................... 358/136
4,591,908 5/1986 Hirano ............................. 358/136

Primary Examiner—Howard W. Britton
Attorney, Agent, or Firm—Gregory P. Gadson

[57] ABSTRACT

A TV image processing device includes a Kalman filtering estimation member (50) which provides for each image point "i" having coordinates $Z_i$ a displacement vector $DK(Z_i)$ based on information contained in two successive images $I(Z_i,t)$ and $I(Z_i,t-TR)$ separated by a period TR. It further includes a second estimation member (60) for providing for each point "i" a displacement vector $DB(Z_i)$, a quality measuring member (70) for evaluating the vectors $DK(Z_i)$ and $DB(Z_i)$ and for influencing a selector (80) for the vectors so as to select that one of the two vectors $DB(Z_i)$ and $DK(Z_i)$ which provides the best estimation quality for the output vector $D(Z_i)$. The Kalman filtering member has an input (90) for receiving the selected vector $D(Z_i)$.

9 Claims, 10 Drawing Sheets

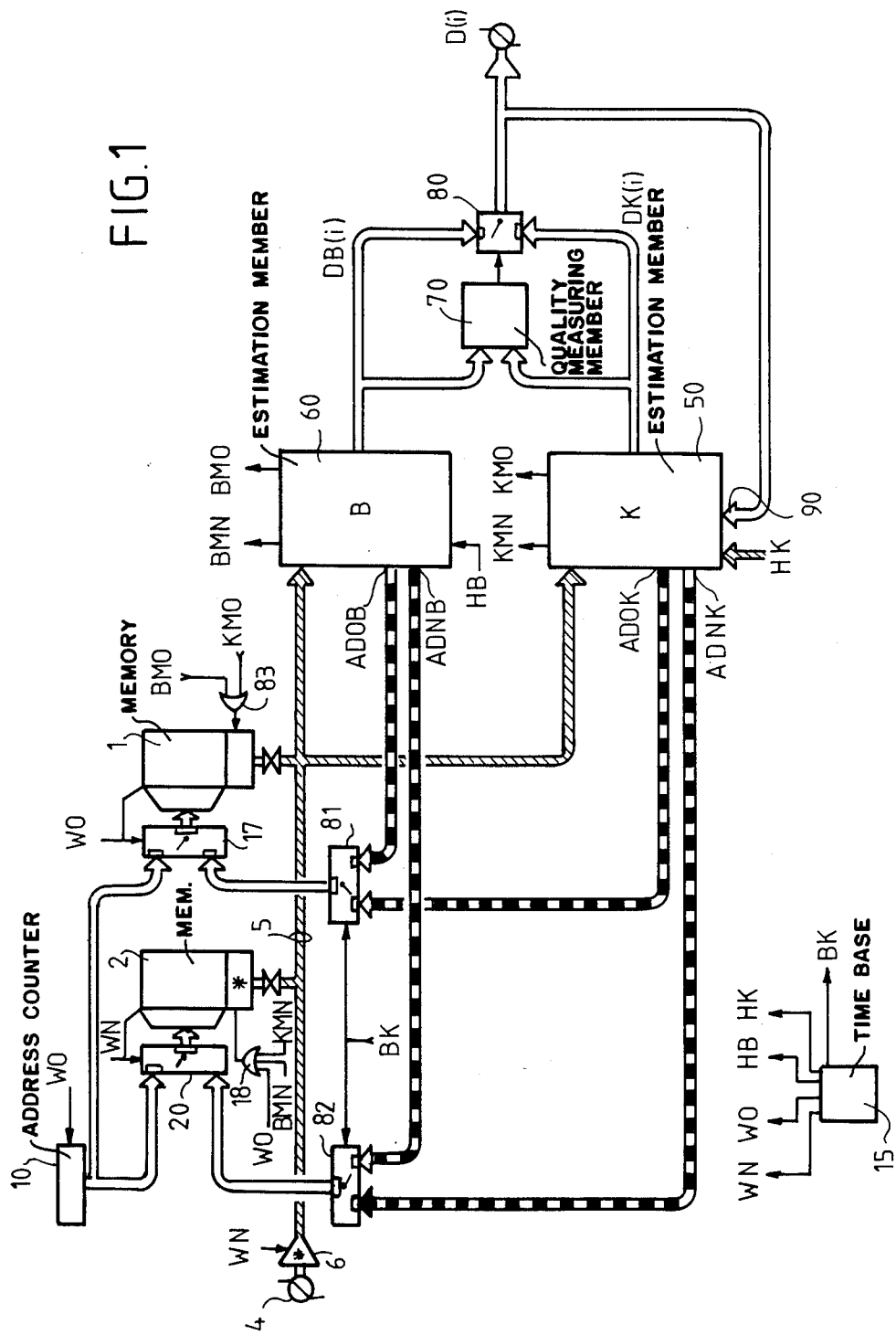

IMAGE-PROCESSING DEVICE FOR ESTIMATING THE MOTION OF OBJECTS SITUATED IN SAID IMAGE

BACKGROUND OF THE INVENTION

The invention relates to an imgage-processing device for estimating the displacement D(i) of objects situated in said image, comprising an estimation arrangement providing for each picture element i, a displacement vector DK(Zi) from two successive images $I(Z_i, t)$ and $I(Z_i, t-TR)$ separated by a period TR.

The quantities $I(Z_i, T+)$ and $I(Z_i, t-TR)$ represent the luminance of picture element i, whose coordinates will be indicated by $Z_i$. If necessary, reference will be made to the vertical coordinate indicated by $y_i$ and the horizontal coordinate indicated by $x_i$.

This device is particularly useful in the field of digital television transmission systems in which it is attempted to transmit sequences of images at bit rates which are as small as possible, while maintaining a satisfactory quality. For example, for obtaining a rate which is twice as small, it has been recommended where only every other image of a sequence is transmitted, which case necessitates a reconstruction of the missing images by means of interpolation if the sequence at the receiver end is to be regenerated. In such cases the displacement values D(i) characterizing the movement from one image to the other image are used to derive the interpolation images IP at the instant $t-TR/2$ in accordance with the formula:

$$IP[Z_i+, t-(TR/2)] = \tfrac{1}{2}\{I[Z_i - D(Zi)/2, t-, TR] + I[Z_i + D(Zi)/2, t]\}$$

A device according to the invention can also be used for tracking targets, in cell biology analysis, etc.

The Article entitled "Kalman Filter Formulation of Low Level Television Image Motion Estimation" by John STULLER and Goplan KRISHNAMURTHY in the magazine Computer Vision Graphics and Image Processing, No. 21, 1983, pages 169 to 204 describes the use of the Kalman filtering concept for estimating the motion of objects in a television image.

It is known that this concept is effective in this technique, though experiments have shown that there is a risk of poor estimation and even of divergence of the filter.

SUMMARY OF THE INVENTION

It is an object of the invention to realize a device of the type described in the opening paragraph which provides a safer motion estimation and substantially avoids the risks of divergence in the filtering operation.

To this end, a device of this type is characterized in that it comprises a second estimation member for providing a displacement vector DB(Zi) for each point "i" of the image, a quality measuring member for evaluating the vectors DK(Zi) and DB(Zi) and for controlling a vector selector to select that one of the two vectors DB(Zi) and DK(Zi) which provides the best estimation for the vector D(Zi), and in that the first estimation member is adapted to receive this vector D(Zi).

In the method according to the invention any divergence of Kalman filtering operations is neutralized and the input for receiving D(Zi) permits of initializing these operations satisfactorily. The second estimation member may have qualities which are better than the Kalman filtering member. The second member is of the type described in the Article "A Motion-Compensated Interframe Coding Scheme for Television Pictures" by YUICHI NINOMIYA and YOSHIMICHI OHTSUKA in the magazine IEEE Transactions of Communications, volume COM-30, No. 1, January 1982, pages 201 to 211. Experience has proved that during 10% of the time it is this last-mentioned member which provides the best estimation, whereas during the rest of this time the Kalman filtering member is the better, the more it is initialized by the information of the second motion estimation member.

Another embodiment in which means are provided for increasing the number of Kalman estimation iterations has the advantage that the motion estimation is further improved.

BRIEF DESCRIPTION OF THE DRAWINGS

The invention will now be described in greater detail by way of example with reference to the accompanying drawings in which FIG. 1 shows diagrammatically, an image-processing device according to the invention.

DETAILED DESCRIPTION OF THE INVENTION

FIG. 1 shows diagrammatically, the image-processing device for estimating the motion of objects in images. This device comprises a first memory 1 for storing all the information concerning one image in a sequence of images and a second memory 2 for storing the subsequent image of the sequence.

It will be explained hereinafter how these memories 1 and 2 register two successive images.

Figure 2:
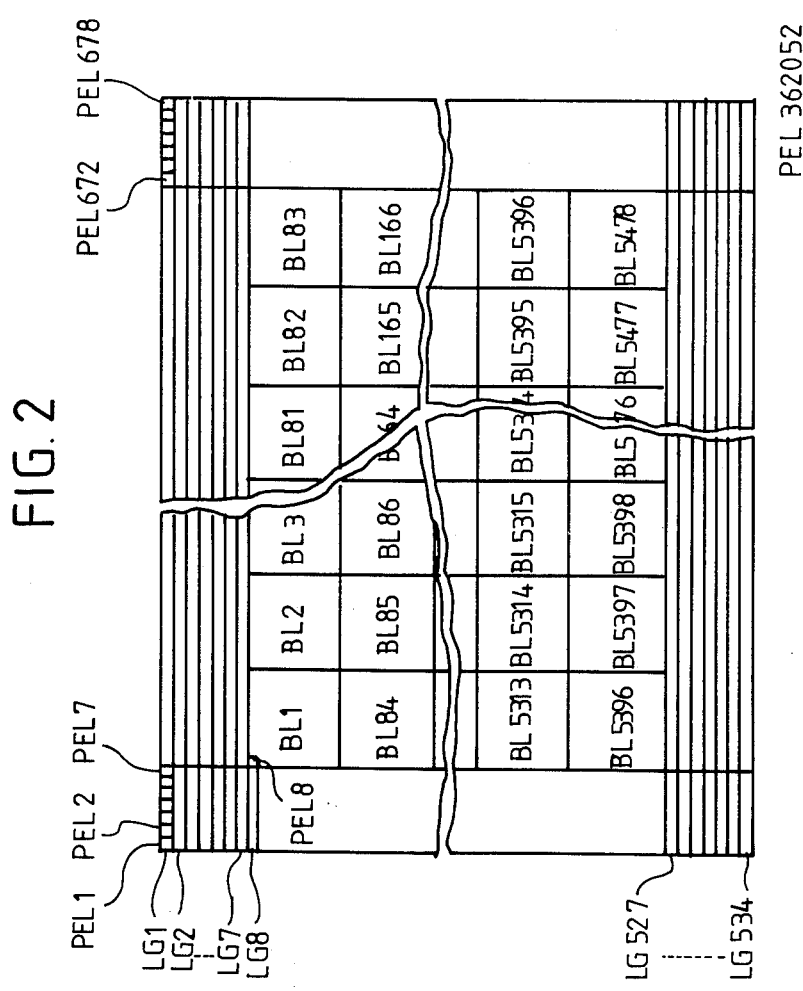
FIG. 2 shows the organization of an image in blocks and picture elements.
Figure 3:
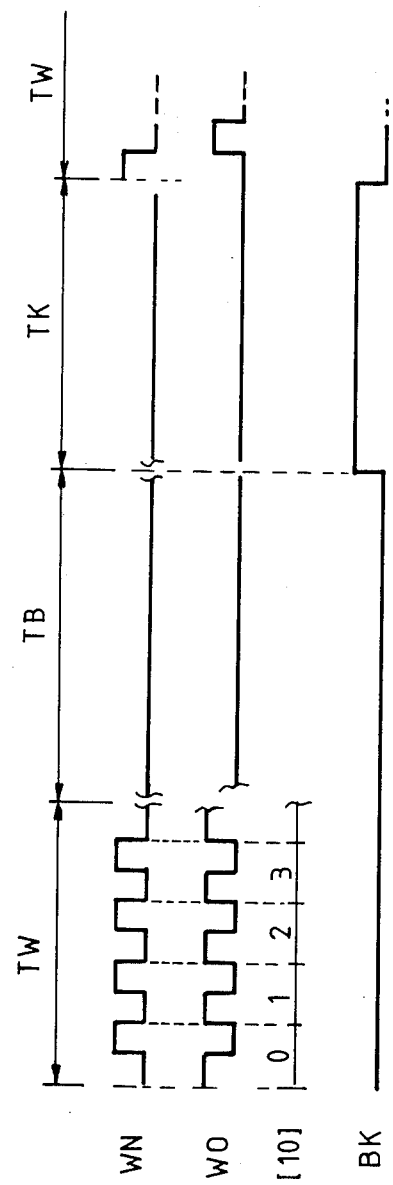
FIG. 3 is a time diagram showing the principal operating cycles of the device according to the invention.

In order to be registered in these memories 1 and 2, the images are built up, for example 534 lines LG1, LG2, ..., LG534 (FIG. 2) and each line consists of 678 picture elements or "pels" (PEL1, PEL2, ..., PEL678 for the line LG1). The luminance level of each pel is coded in a digital form by a binary word comprising eight elements. These words are supplied to a terminal 4 connected to a data line 5 by means of a tristate amplifier arrangement 6 which is turned on by a signal WN. This line is connected to the data inputs of the memories 1 and 2. These words are to be arranged in the memories 1 and 2 in locations defined by a write address counter 10 during the write period TW (FIG. 3). The different picture elements are continuously arranged in these memories, that is to say: the element PEL1 is arranged at the address "0", PEL2 at the address "1", . . . , PEL 678 at the address "677", the element PEL 679 of the subsequent line is arranged at the address "678", . . . until the last element PEL362052 arranged at the address "362051". During the time lapse TW for an address code provided by the write address counter 10 the addressed word in the memory 2 is made available on the data line 5 so as to be registered in the memory 1 and subsequently the word present at the terminal 4 is registered in the memory 2. In order to carry out these operations, different signals WN and WO processed by a time base 15 (FIG. 3) are used:

the signals WO, whose leading edges cause the counter 10 to increment, set the memory 1 in the write position and its address input is connected by means of a switch 17 to the counter 10 and render the data output of the memory 2 conducting by means of an OR gate 18, the signals WN set the memory 2 in the write position and connect its address input to the counter 10 by means of a switch 20.

At the end of this time lapse TW two successive images are stored in the memories 1 and 2. Based on the information in the memories 1 and 2 the motion of objects in two successive images is estimated. For this purpose a Kalman filtering estimation member 50 is used which provides the displacement vector DK(i) for each point "i" of the image in the memory 2. This displacement vector $DK(Z_i)$ consists of two components $DK_x(Z_i)$ and $DK_y(Z_i)$. The component $DK_x$ represents the horizontal displacement in the direction of the lines and the component $DK_y$ represents the vertical displacement in the direction perpendicular thereto.

For providing a motion indication D(Zi) comprising components $D_x(Z_i)$ and $D_y(Z_i)$ of the best possible quality the device shown in FIG. 1 according to the invention is characterized in that it comprises a second estimation member 60 for providing a displacement vector $DB(Z_i)$ comprising components $DB_x(Z_i)$, $DB_y(Z_i)$ for each point "i", a quality measuring member 70 for evaluating $DB(Z_i)$ and $DK(Z_i)$ and for influencing a vector selector 80 so as to select that one of the two vectors $DB(Z_i)$ and $DK(Z_i)$ which provides the best estimation quality for the vector $D(Z_i)$, and in that the filtering member 50 has an input 90 for receiving this vector $D(Z_i)$.

According to the method shown the second estimation member 60 effects a correlation in blocks as described in the second Article mentioned hereinbefore and the estimation of the vector $DB(Z_i)$ is effected first during the time lapse TB after the time lapse TW in the rhythm of the signals HB provided by the time base 15. This member 60 uses the words in the memories 1 and 2 and for this purpose it is provided with the inputs ADOB and ADNB for transmitting the address codes to the memories 1 and 2 via switches 81 and 82. The data outputs of these memories are rendered conducting by signals BMN and BMO which are active via the gate 18 and via an OR gate 83, respectively.

The vectors $DB(Z_i)$ are estimated and stored in the manner to be described hereinafter. A signal supplied by the time base 15 brings about the change in position of the switches 81 and 82 and connects the address code inputs of the memories 1 and 2 to the inputs ADNK and ADNO provided on the filtering member 50. Signals KMN and KMO applied to these memories via the gates 18 and 83 make the data of these memories accessible. Thus the vectors $DK(Z_i)$ are estimated by means of the estimation member 50 during the time lapse TK in the rhythm of the signals HK supplied by the time base 15. The quality measuring member 70 compares for each point "i" the vectors $DK(Z_i)$ with the vectors $DB(Z_i)$ at the same point "i"; the one which gives the best motion estimation is retained by means of the selector 80 for constituting the effective displacement vector $D(Z_i)$ on the one hand and for being used by the Kalman filtering member 50 for estimation of the vector $DK(Z_i+1)$ on the other hand.

Figure 4:
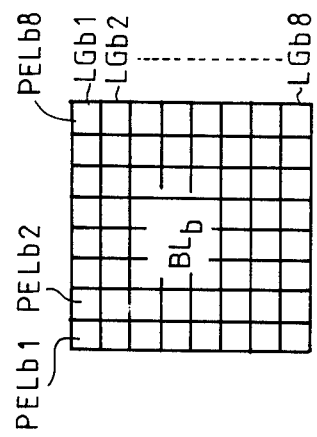
FIG. 4 shows the organization of an image block.

The second estimation member 60 influences the blocks of picture elements. The different blocks of picture elements to be considered are present in a number of 5478 and are formed (FIG. 4) from 8 lines LGb1, LGb2, . . . , LGb8 whose length comprises 8 picture elements PELb1, PELb2, . . . , PELb8 and which are arranged in a contiguous manner. These blocks have fixed locations in the recent image (that is to say, the image stored in the memory 2); thus the element PELb1 of the line LGb1 of the block BL1 corresponds to the element PEL8 of the line LG8 of the image. On the other hand different blocks of the old image (the image stored in the memory 1) are considered so as to compare them with each of the blocks of the recent image. In this example this comparison is carried out in three steps. For the purpose of the following explanation the block BL1 of the recent image is considered on the one hand, and the different blocks of the old image marked by the element PELb1 of the line LGb1 are considered on the other hand: during the first step among the following blocks of the old image that one is determined which gives the best correlation measured by the member 1006, PEL8, LG8 and PEL(8±4), LG(8±4), that is:

PEL4, LG4
PEL8, LG4
PEL12, LG4
PEL4, LG8
PEL12, LG8
PEL4, LG12
PEL8, LG12
PEL12, LG12.

It is assumed that the block PEL8, LG12 gives the best correlation. Going on to the second step, it is determined as from the block PEL8, LG12 which of the following blocks gives the best correlation: PEL8, LG12 and PEL(8±2), LG(12±2), that is:

PEL6, LG10
PEL8, LG10
PEL10, LG10
PEL6, LG12
PEL10, LG12
PEL6, LG14
PEL8, LG14
PEL10, LG14.

Now it is assumed that it is the block PEL10, LG14 which gives the best correlation Third step: among the following blocks the one which gives the best correlation is determined. PEL10, LG14 and PEL(10±1), LG(14±1), that is:

PEL9, LG13
PEL10, LG13
PEL11, LG13

PEL9, LG14
PEL11, LG14
PEL9, LG15
PEL10, LG15
PEL11, LG15.

Supposing that it is the block PEL11, LG14 which gives the best correlation, the displacement vector which is defined by the location of the latter block (PEL11, LG14) and the location of the block BL1 (that is to say, PEL8, LG8) is then determined.

Figure 5:
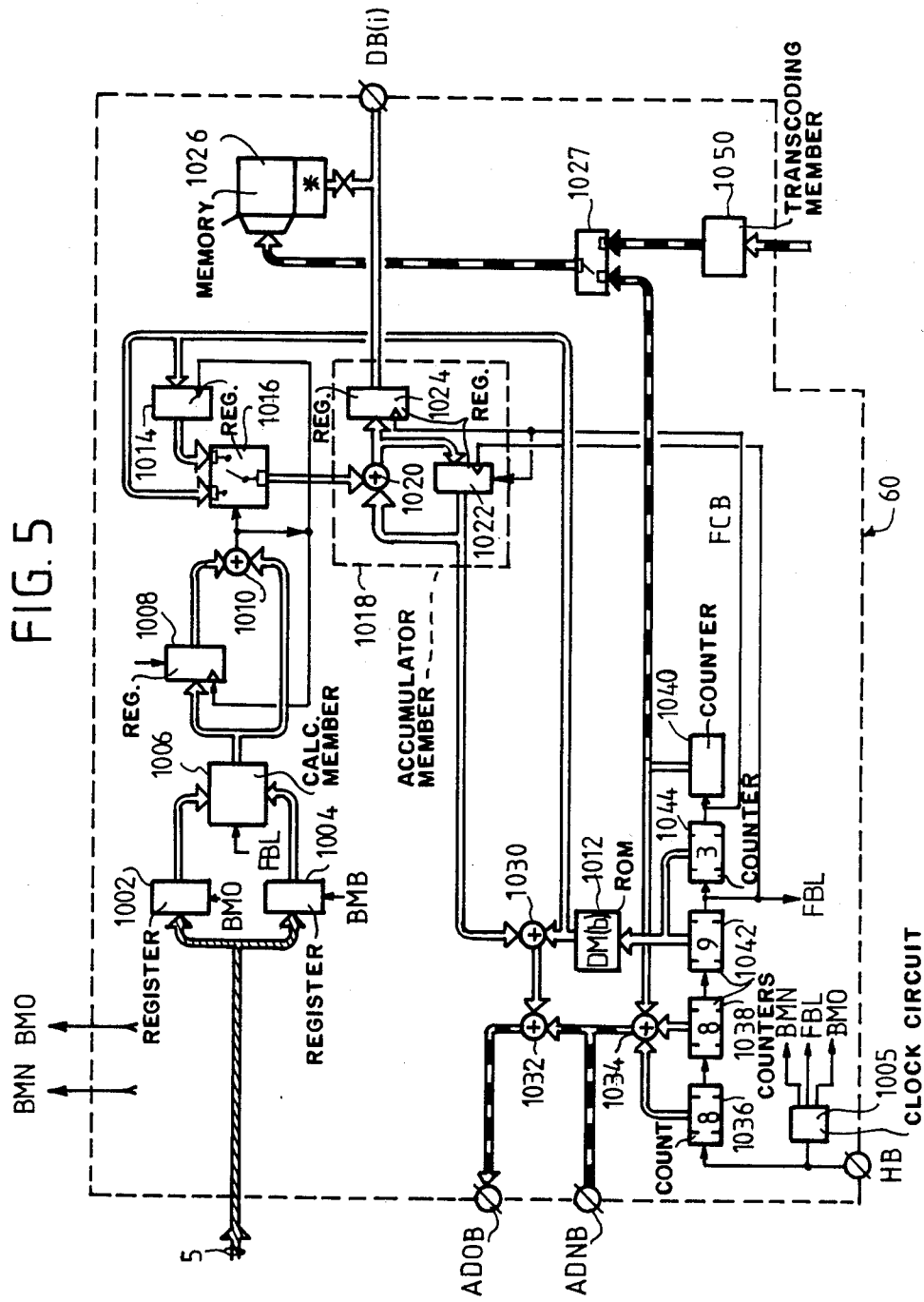
FIG. 5 shows a diagram of a second filtering member using a correlation of blocks.

The estimation member 60 operating as described hereinbefore is shown in FIG. 5. It consists of two registers 1002 and 1004 for storing the binary words from the memories 1 and 2 which are addressed by the address codes applied to the inputs ADOB and ADNB. Signals BMN and BMO processed by means of a clock circuit 1005 from the signal HB are active for reading these memories and premit of registering read words originating from these memories. A calculating member 1006 calculates the correlation for each of the envisaged blocks and the presence of the output value is indicated by a signal FBL signaling the end of treating a block; the result provided by this calculation member is applied to the input of a register 1008 on the one hand, and to an input of a subtraction member 1010 on the other hand whose other input is connected to the output of the register 1008. Of the result provided by this member 1010, only the value of the sign is considered. This value may enable the storage of the correlation value in the register 1008, may enable the storage of a value DM(b) from a read-only memory 1012 in a register 1014 and finally controls the switching position of a switch 1016. It is in this read-only memory 1012 that the different displacement vectors $D_{0,0} \ldots D_{0,8}, D_{1,0}, \ldots D_{1,8}, D_{2,0} \ldots D_{2,8}$ are stored which correspond to what has been described above. In a first position the output of the switch 1016 is connected to the output of the register 1014 and in the second position, the output is connected to the input of this register 1014. An accumulator member 1018 is connected to the output of the switch 1016; this member consists of an adder 1020 and two registers: an accumulation register 1020 and an output register 1024 which are connected to its output; the charge controls of these registers receive the signals FBL and FCB, respectively. The displacement indication appears at the output of the register 1024; this indication is stored in a memory 1026 addressed by the output code of an address code switch 1027. The adder 1020 sums the available values at the output of the switch 1016 and the register 1022. A further adder 1030 sums the values appearing at the output of the accumulator member 1018 on the one hand or more especifically at the output of the register 1022 and at the output of the read-only memory 1012 on the other hand. This adder 1030 applies to a further adder 1032 to value to be added to the read address code of the memory 2 (code ADNB) for obtaining the read code of the memory 1 (code ADOB). The code ADNB is obtained by an adder 1034 summing the contents of the different counters 1036, 1038 and 1040. The counter 1036 is a modulo-8-counter whose contents serve to address the 8 picture elements (pel) of a line in a block; the counting signals HB are divided by eight at the output of this counter and thus increment the contents of the modulo-8-counter 1038 for addressing the 8 lines of a block; the output signals of this counter 1038 are applied to the counting signal input of a modulo-9-counter 1042 and the output signals of this counter 1042 are applied to a modulo-3-counter 1044.

The contents of the modulo "5478" counter 1040 incrementing on the output signals of the counter 1042 provide the address of the block. The contents of this counter 1040 are also used for addressing the memory 1026 via the switch 1027 and for registering the values DB(Zi). For comparing DB(Zi) with DK(Zi) the switch 1027 may connect the address input of the memory 1026 to the output of a transcoding member 1050 which provides the address of the block for any picture element code.

Figure 6:
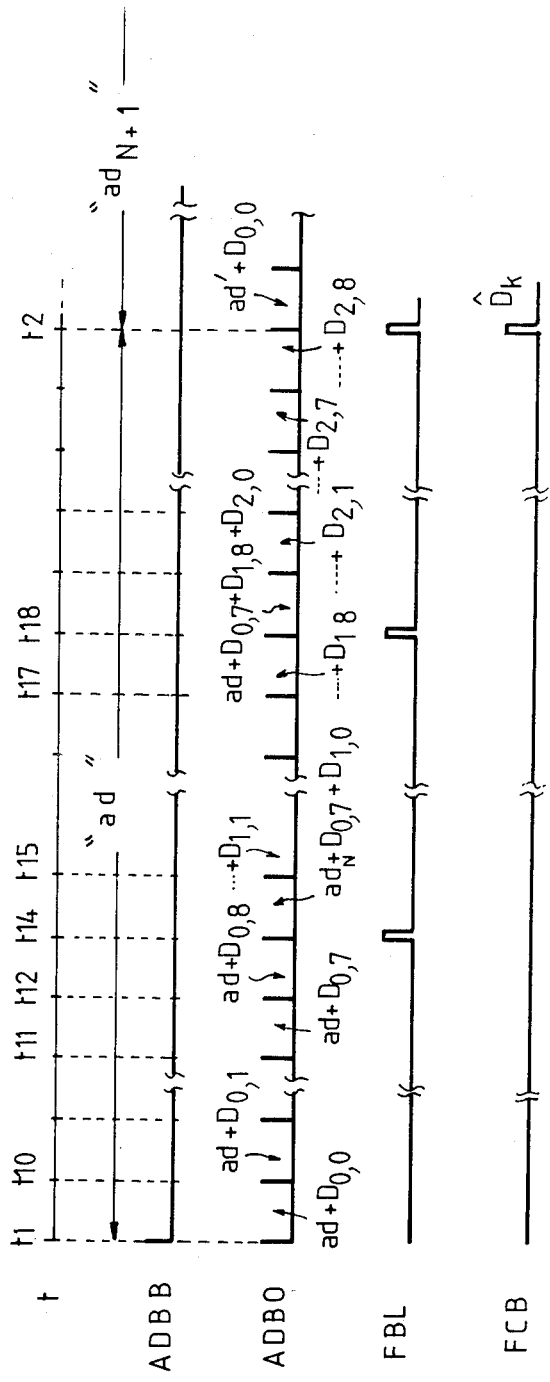
FIG. 6 is a time diagram showing the operation of the second filtering member according to FIG. 5.

The operation of the estimation member 60 will now be explained with reference to FIG. 6. At the instant "$t_1$" the code ADBB provided by the counter 1040 is equal to a value "ad" and thus defines a block in the memory 2; this code remains fixed until the instant "$t_2$" for a period which is sufficient to determine the block in the memory 1 giving the best correlation. The counters 1036 and 1038 successively address the different binary elements of the blocks associated with the memory 2 and the different binary elements of the blocks of the memory 1. The adder 1034 combines the contents of the counters 1036, 1038 and 1040. Due to the presence of the counters 1042 and 1044 between the instants "$t_1$" and "$t_2$" the block defined by the address "ad" will be read twenty-seven times which corresponds to nine correlations imposed by each of the three steps mentioned hereinbefore. The output signal FBL of the counter 1042 notably permits of registering the location of the block which has given the best correlation in the register 1022. This information combined with that provided by the memory 1012 gives the location of the block to be read in the memory 1. The memory 1012 provides at the instants $t_2$, $t_{10}$, $t_{11}$ and $t_{12}$ the increments (positive or negative) $D_{0,0}, D_{0,1}, \ldots, D_{0,7}$ and $D_{0,8}$ to be brought to the value "ad". At the instant $T_{14}$ the signal FBL becomes active so that one of the values $D_{0,0}$ to $D_{0,8}$ is registered in the register 1022. If it is assumed that this is the value $D_{0,7}$, the increment brought to the value "ad" will be $D_{0,7}+D_{1,0}$ after the instant $t_{14}$, then $D_{0,7}+D_{1,1}$ at the instant $t_{15}$ and so forth until the instant $t_{17}$ with ad$+D_{0,7}+D_{1,8}$. If it is assumed that the value $D_{1,8}$ provides the best correlation, a value of ad$+D_{0,7}+D_{1,8}+D_{2,0}$ will be available after the instant $t_{18}$ and the process continues until the instant $T_2$ when the signal FCB becomes active for registering the retained value in the register 1023.

Figure 7:
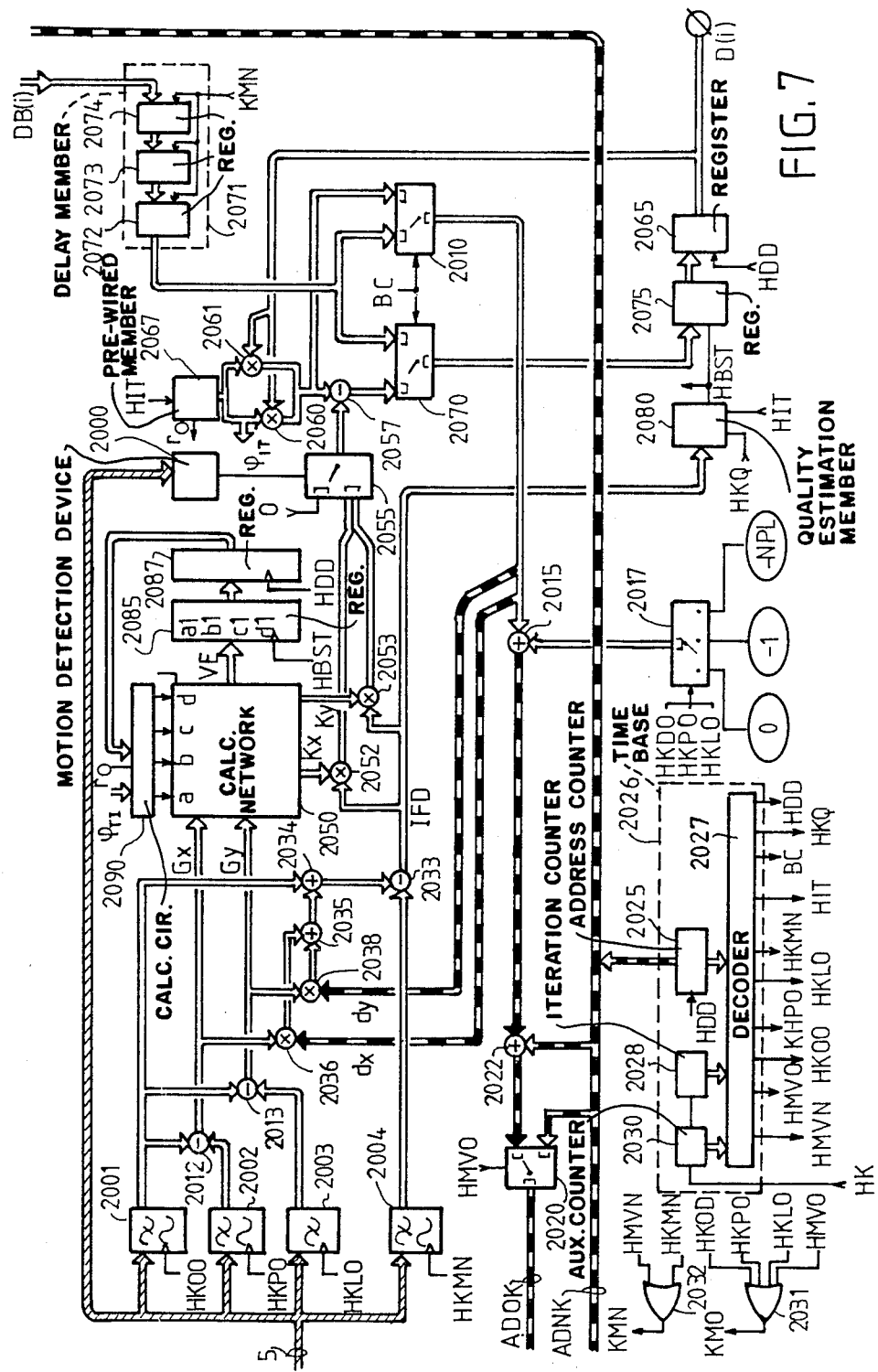
FIG. 7 shows an embodiment of the first Kalman estimation member combined with the quality measuring member and the vector selector.

The Kalman filtering estimation member 50 operates as follows:

Let it be assumed that the displacement vector DK(i) for a point "i" is evaluated between two fields succeeding each other at the instants "t−TR" and "t", respectively. In FIG. 7 a point O(i) is shown in a field occurring at the instant "t−T". This point O has a coordinate $Z_i$ representing the abscissa "$x_i$" on the one hand which correspond to the position of this point on one line and on the other hand "$y_i$" which corresponds to the number of the line. In the next field this point O may be displaced in accordance with a vector DK(i) composed of $DK_x$, $DK_y$. If $I(Z_i)$ is referred to as the luminous intensity relative to this point, we may write:

$$I(Z_i, t-TR)=O(Z_i, t-TR)+n(Z_i, t-TR)$$

$$O(Z_i, t)=O(Z_i-DK_i, t-TR)$$

where n( . . . ) represents the noise component.

The reference $FD(Z_i)$ is the field difference for a point having a coordinate $Z_i$ which can be written as:

$$FD(Z_i) = I(Z_i, t) - I(Z_i, t-T)$$

or:

$$FD(Z_i) = O(Z_i - DK_i, t-T) - O(Z_i, t-T) + n(Z, t) - n(Z, t-T)$$

If $DK_i$ is small, a Taylor series expansion is effected:

$$FD(t_i) = \frac{\partial O}{\partial DK_{xi}} DK_{xi} + \frac{\partial O}{\partial DK_{yi}} DK_{yi} + f(DK_i)$$

in which f represents a function of $DK_i$ of the order higher than 2.

By denoting $G(Z_i)$ as the gradient $(\delta O)/(\delta D)$ and the asterix denoting whether the vector of the transposed matrix must be considered as the case may be, the expression for measuring the Kalman filter can be written as:

$$FD(Z_i) = -G^*(Z_i) \cdot DK(Z_i) + N(Z_i)$$

in which $N(Z_i)$ is the measuring noise.

Assuming that the motion of an element with the coordinate $Z_i$ is not so different from an element located nearby, for example the preceding pel of the coordinate $Z_{i-1}$, we can write $$DK(Z_i) = \phi DK(Z_{i-1}) + W(Z_{i-1})$$

$\phi$ is a predefined transition matrix
W( . . . ) is a white noise component.

$DP(Z_i)$ is referred to as the aforementioned motion from the motion estimation $DK(Z_{i-1})$ of the preceding pixel thus situated in $Z_{i-1}$.

$$DP(Z_i) = \phi \cdot DK(Z_{i-1})$$

From this prediction a prediction in the difference of the field $FDP(Z_i)$ is determined:

$$FDP(Z_i) = -G(Z_i) \cdot DP(Z_i)$$

The filtering operation in accordance with the Kalman theory can be considered as follows:

$$DK(Z_i) = \phi \cdot DK(Z_{i-1}) + K(Z_i) \cdot IFD(Z_i) \quad (8)$$

In accordance with this theory $IFD(Z_i)$ is an innovation and in the envisaged case it is applied in the present invention; this magnitude can be written as:

$$IFD(Z_i) = I(Z_i, t) - I(Z_i - DK(Z_i), t-T) \quad (9)$$

$K(Z_i)$ is the Kalman gain which in this case is a vector having two components $K_x(Z_i)$ and $K_y(Z_i)$.

$$K(Z_i) = VP(Z_i) \cdot H(Z_i)^* \cdot \sigma \quad (10)$$

where $H(Z_i) = -G^*(Z_i)$ and $\sigma = [H(Z_i) \cdot VP(Z_i) \cdot H(Z_i)^* + r^2(Z_i)]^{-1}$ $r^2$ represents the noise $$VP(Z_i) = \phi \cdot VE(Z_{i-1}) \cdot \phi^* + Q(Z_{i-1}) \quad (10 \text{ bis})$$

$$VE(Z_{i-1}) = [I - K(Z_{i-1}) \cdot H(Z_{i-1}) \cdot VP(Z_{i-1})] \quad (11)$$

where I is the unit matrix.

The matrix representing $VE(Z_{i-1})$ can be explained as:

$$VE(Z_{i-1}) = \begin{vmatrix} a_1 & b_1 \\ c_1 & d_1 \end{vmatrix} \quad (12)$$

and the matrix $VP(Z_i)$ as $$VP(Z_i) = \begin{vmatrix} a & b \\ c & d \end{vmatrix}$$

while as an initial condition is taken:

$$VE = (Z_0) = \begin{vmatrix} ka & O \\ O & kd \end{vmatrix}$$

$$DE(Z_0) = \begin{vmatrix} O & O \\ O & O \end{vmatrix}$$

the Kalman filtering member thus operates in the following manner in a plurality of steps with a plurality of iterations: for the iteration "i" relative to the point "i":

first step: Kalman gain calculation $K(Z_i)$, for which are determined:

$H(Z_i)$ or $G(Z_i)$ by analysis of the image in the memory 1

$VP(Z_i)$ as a function of the value $VE(Z_{i-1})$ determined at the preceding iteration formula (10) is then applied.

Second step: calculation of the estimated displacement vector $DK(Z_i)$ formula (8); this is determined by measuring IFD (formula (9)).

Third step: storing for the iteration "i+1" the values: $VE(Z_i)$ and $DK(Z_i)$ DE being the value $D(Z_i)$ according to the invention, i.e. the value determined by the member 70.

According to an important characteristic feature of the invention the three steps with $\phi$ and r being different are carried out several times for each iteration "i"; the value $DK(Z_i)$ which is retained gives the smallest possible value IFD.

FIG. 7 shows in detail the Kalman filtering estimation member 50 combined with the other estimation members 70 and the switching member 80.

The data line 5 is connected to the inputs of a motion detection device 2000 (shown in detail in FIG. 8) and of four digital low-pass filters 2001, 2002, 2003 and 2004 (shown in detail in FIG. 13) whose operating cycle inputs receive the signals HKOO, HKPO, HKLO and HKMN, respectively. These filters reduce the image frequency components by one third and introduce a delay of three picture elements. The filter 2001 is intended to process luminance information relative to the picture element which is stored in the memory 1 and whose address is defined by a displacement code which is present at the output of a switch 2010. The filter 2002 is intended to process luminance information relative to the preceding picture element of the same line. The filter 2003 is intended to process luminance information relative to the picture element of the preceding line; due to this information it is possible to obtain the luminance gradient Gx and Gy of the picture element defined by the output code of the switch 2010 at the outputs of the subtractors 2012 and 2013. For this purpose the inputs of the subtractor 2012 are connected to the outputs of the filters 2001 and 2002, respectively, and the inputs of the subtractor 2013 are connected to the outputs of the filters 2001 and 2003, respectively. For addressing these different elements the output code of the switch 2010 is either or not modified by an adder 2015 which adds this output code to the code which is present at the output of a switch 2017 to the inputs of which a "0" is applied indicating whether the code of the switch 2010 is not modified; a code "−1" indicating whether the preceding picture element is to be considered and a code −NPL indicating whether the picture element of the preceding line is to be considered. The positions of this switch 2017 are thus controlled by means of signals HKPO, HKOO and HKLO. The address code effectively applied to the memory 1 originates from the output of a switch 2020 having two inputs one of which is connected to the output of an adder 2022 and the other is connected to the output of address counter 2025 particularly used for addressing the memory 2 and forming part of a time base 2026 fed by the signals HK.

Figure 9:
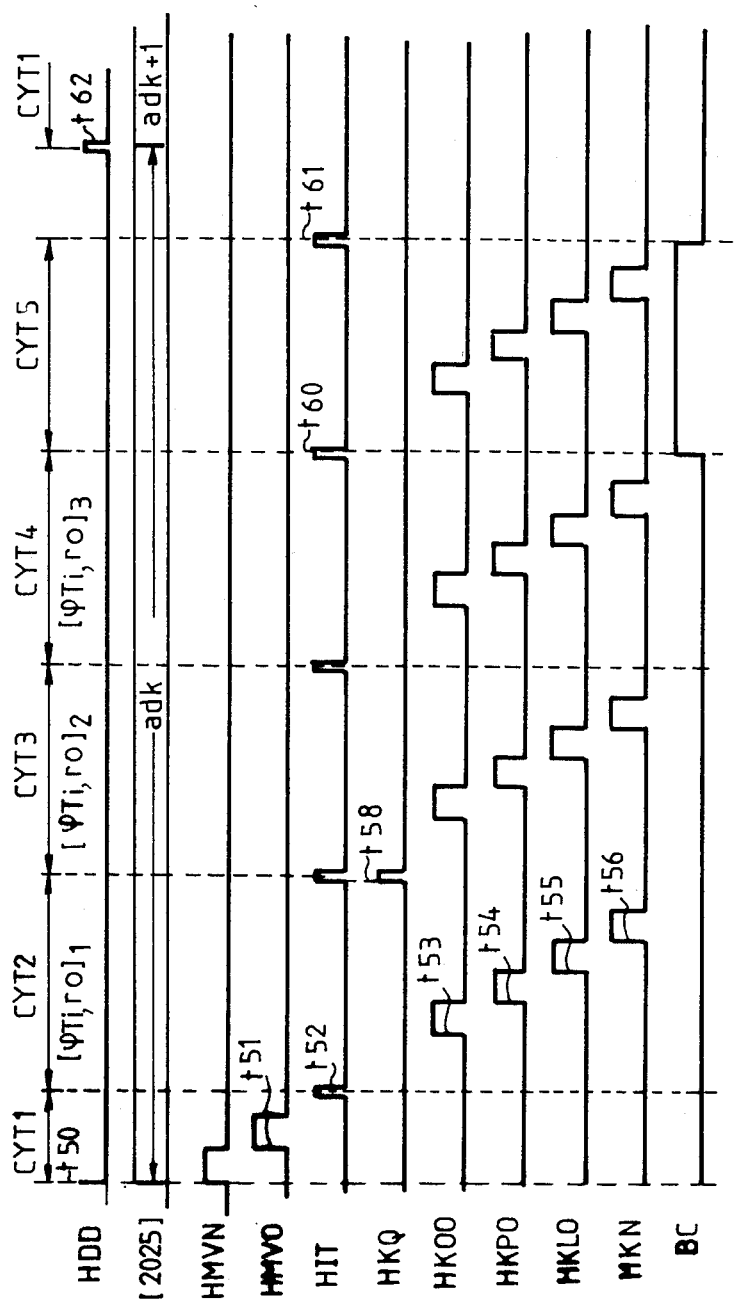
FIG. 9 shows a time diagram to explain the operation of the members shown in FIG. 7.

The inputs of the adder 2022 are connected to this counter 2025 and to the output of the adder 2015, respectively. The counter 2025 is incremented in the rhythm of the signals HDD which are processed by a decoder 2027 cooperating with an iteration counter 2028; particularly a signal BC, a signal HKO and a signal HIT are derived from this decoder. The signals HKOO, HKPO, HKLO and HKMN already stated above and also a signal HMVO for the control of the position of the switch 2020 and at last signal HMVN are also processed by this time base 2026 by means of the decoder 2027 and an auxiliary counter 2030. The shape of all these signals is shown in FIG. 9. There is also an OR gate 2031 which processes the signal KMO for the memory 1 from the signals HKOO, HKPO, HKLO and HMVO and an OR gate 2032 which processes the signal KMN for the memory 2 from the signals HKMN and HMVN.

The filter 2004 is intended to process luminance information relative to the picture element in the memory 2 whose address is given by the contents of the counter 2025. A subtractor 2033 provides the innovation IFD (see formula 9); for this purpose one of its inputs is connected to the output of the filter 2004 and the other input is connected to the output of an adder 2034 which adds a correction or interpolation value provided by an adder 2035 to the information in the register 2001.

The information at the output of the switch 2010 resulting in different processing steps is split up in two parts: one intergral part which may be used for addressing the memories 1 and 2 and one fractional part split up in two components dx and dy. The adder 2035 produces the sum of the results given by the multipliers 2036 and 2038, i.e. Gx.dx and Gy.dy. A calculating network 2050 (shown in detail in FIG. 10) calculates the Kalman gain; this value is vectorial and has two components Kx and Ky which are each multiplied by multipliers 2052 and 2053 by the value IFD. The resultant signal of this operation by K is applied to one of the two inputs of a switch 2055 the other input of which receives the signal "0". The positions of this switch are controlled by the output signal of the motion detector so that the value "0" is available at the output of the switch 2055 when no motion has been detected. If a motion has been detected the output of the switch 2055 is connected to the outputs of the multipliers 2052 and 2053. An adder 2057 provides the result indicated in formula (8). The matrix multiplication operation by means of $\phi$ is simplified in the sense that the matrix $\phi$ is in the form of: $\phi = I \cdot \phi_{iT}$ in which I is the unit matrix and $\phi_{iT}$ is a scalar product. In accordance with an important aspect of the invention different values of $\phi_{iT}$ are to be successively multiplied by the multipliers 2060 and 2061 by the components of the vector $DK(Z_{i-1})$ in a register 2065. The different values of $\phi_{iT}$ are sorted by a pre-wired member 2067 in the rhythm of the signals HIT. The output of the adder 2057 is connected to one of the two inputs of a switch 2070 the other input of which is connected to the data output of the memory 1026 (FIG. 5) by means of a delay member 2071. This member has for its object to compensate for the delay of the three picture elements effected by the filters 2001, 2002, 2003 and 2004. For this purpose it has three registers 2072, 2073 and 2074 which are arranged in cascade and whose registering inputs receive the signal KMN. The change in position of this switch 2070 is determined by the signal BC. The output of the switch 2070 is connected to the input of a register 2075 whose output is connected to the input of the register 2065. The registering control signals for the registers 2075 and 2065 are a signal HBST and the signal HDD, respectively. The signal HBST is used to register the best estimation and is processed by the quality estimation member 2080 as a function of the value IFD; this member 2080 is shown in detail in FIG. 11. The calculating network 2050 also provides the value VE (see formulas (11) and (12). This value is applied to the input of a first register 2085 whose output is connected to the input of a second register 2087. The registering control signals of these registers are the same as those of the registers 2075 and 2065, i.e. the signals HBST and HDD. A calculating circuit 2090 shown in detail in FIG. 12 processes the value VP.

Figure 8:
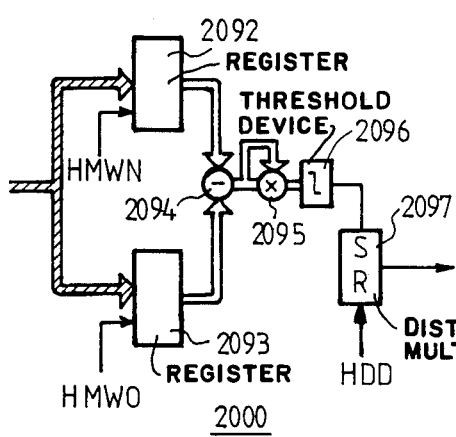
FIG. 8 shows the structure of a motion detector.

The motion detector shown in FIG. 8 comprises two registers 2092 and 2093 for registering words originating from the memories 1 and 2, respectively and situated at the same address; for this purpose the signal HMVN is activated for each address code processed by the counter 2025 for the purpose of registering the data of the memory 2 in the register 2092 and the signal HMVO is activated for registering the data of the memory 1 in the regiser 2093, which second signal influences the switch 2020 (FIG. 7). A subtractor 2094 effects the difference between the contents of these two registers 2092 and 2093 and the square value is determined by means of a multiplier 2095; if this value is less than a given threshold determined by the threshold device 2096, a bistable multivibrator 2097 is set to the position "1" so that a signal "0" is present at the output of the switch 2055 (FIG. 7) indicating that there is no motion. This bistable multivibrator 2097 is reset to zero by the signal HDD.

Figure 10:
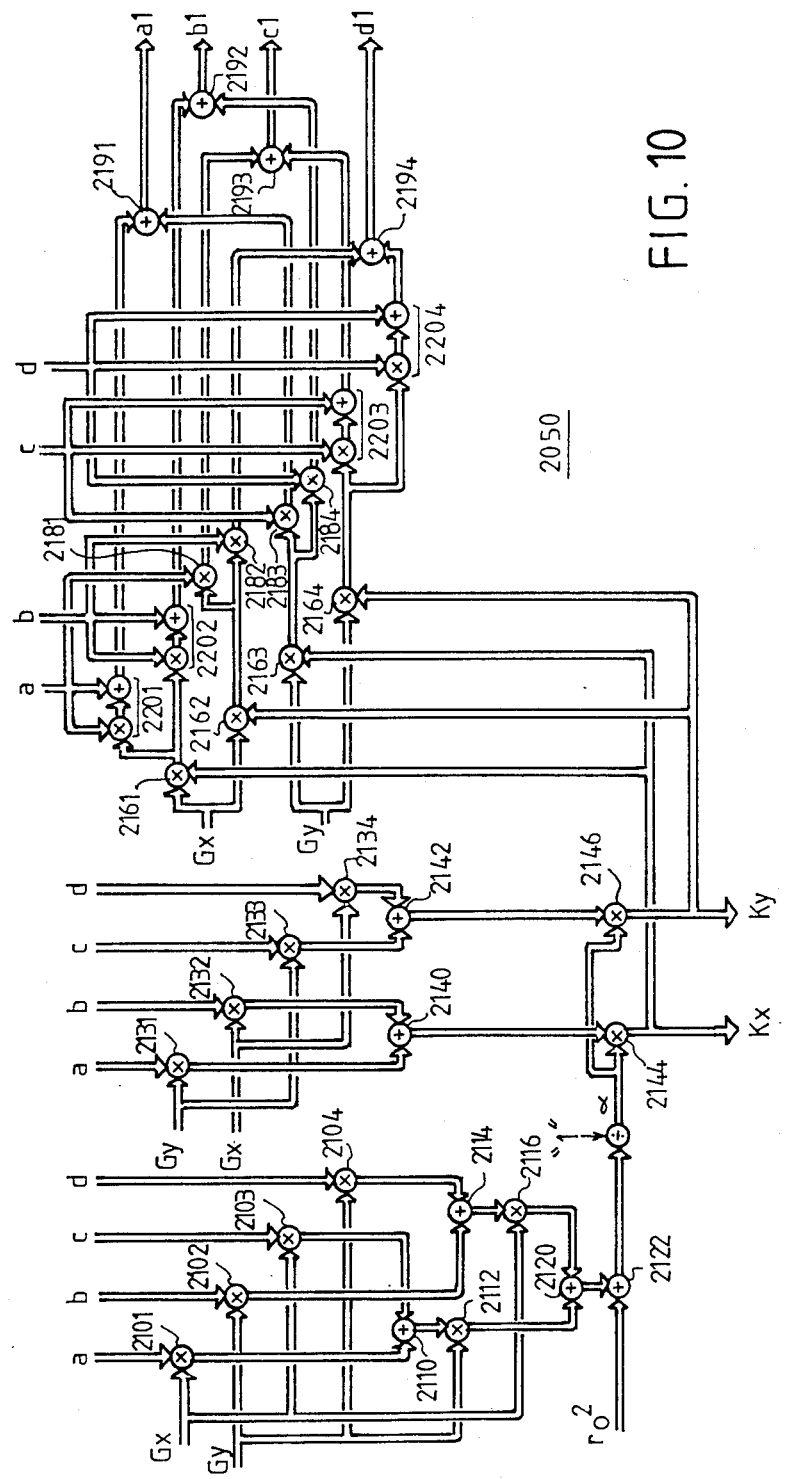
FIG. 10 is a diagram of a first calculating network forming part of the Kalman estimation member of FIG. 7.

The calculating network 2050 shown in detail in FIG. 10 will now be described. It comprises a first series of multipliers 2101, 2102, 2103 and 2104 for carryin out the operations: a.Gx, b.Gy, c.Gx, d.Gy, respectively. An adder 2110 provides (a.Gx)+(c.Gx). A multiplier 2112 provides Gy[(a·Gx)+(c·Gy)], an adder 2114 provides (d·Gy)+(b·Gy) and a multiplier 2116 provides Gx[(d·Gy)+(b·Gy)]. These two quantites given by the multipliers 2112 and 2116 are added together by the adder 2120 and finally the quantity $r^2_0$ provided by the circuit 2067 is added to this result by means of the adder 2122. By means of a divider 2124 the inverse value of the quantity processed by the adder 2122 is taken. If $\alpha$ is referred to as the inverse quantity, it holds that $$\alpha^{-1} = Gx(a \cdot Gx + c \cdot Gy) + Gy(b \cdot Gx + d \cdot Gy)$$

A second series of multipliers 2131, 2132, 2133 and 2134 carries out the following operations:

$$a \cdot Gy$$
$$b \cdot Gx$$
$$c \cdot Gy$$
$$d \cdot Gx$$

An adder 2140 provides:

$$a \cdot Gy + b \cdot Gx$$

An adder 2142 provides $$c \cdot Gy + d \cdot Gx$$

The Kalman gain is finally given by the multipliers 2144 and 2146

$$Kx = (a \cdot Gy + b \cdot Gx) \cdot \alpha$$
$$Ky = (c \cdot Gy + d \cdot Gx) \cdot \alpha$$

The rest of the circuit is used for determining the components a1, b1, c1, d1 of the value VE. For this purpose a third series of multipliers 2161, 2162, 2163 and 2164 provides $$Gx \cdot Kx$$
$$Gx \cdot Ky$$
$$Gy \cdot Kx$$
$$Gy \cdot Ky$$

A fourth series of multipliers 2181, 2182, 2183 and 2184 provides $$(Gx \cdot Ky) \cdot a$$
$$(Gx \cdot Ky) \cdot b$$
$$(Gy \cdot Kx) \cdot c$$
$$(Gy \cdot Kx) \cdot d$$

Four adders 2191, 2192, 2193 and 2194 provide the values a1, b1, c1 and d1 from the respective results provided by four couples of multiplier-adders 2201, 2202, 2203 and 2204

$$(Kx \cdot Gx + 1)a$$
$$(Kx \cdot Gx + 1)b$$
$$(Ky \cdot Gy + 1)c$$
$$(Ky \cdot Gy + 1)d$$

finally resulting in:

$$a1 = a(1 + Kx \cdot Gx) + c \cdot Kx \cdot Gy$$
$$b1 = b(1 + Kx \cdot Gx) + d \cdot Kx \cdot Gy$$
$$c1 = c(1 + Ky \cdot Gy) + a \cdot Ky \cdot Gx$$
$$d1 = d(1 + Ky \cdot Gy) + b \cdot Ky \cdot Gx$$

Figure 11:
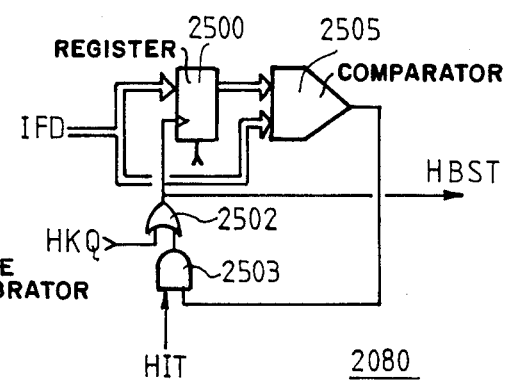
FIG. 11 shows a diagram of a quality measuring member.

The quality estimation member shown in FIG. 11 comprises a register 2500 whose input receives the signal IFD and whose registering control signal originates from an OR gate 2502 having two inputs one of which receives the signal HKQ and the other receives the output signal from an AND gate 2503. This AND gate 2503 has two inputs, one of which receives the signal HIT and the other receives the output signal of a comparator 2505. This comparator is provided for comparing the information in the register 2500 and IFD. The output signal HBST is supplied by the gate 2502. The comparator provides a "0" when the value in the register 2500 is higher than IFD. In the register 2500 the minimum value of IFD is thus present during the entire processing cycle between two appearances of the signal HKQ.

Figure 12:
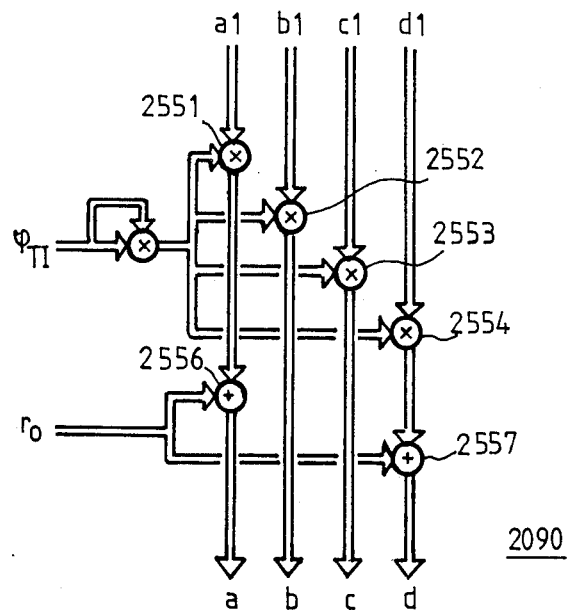
FIG. 12 shows a diagram of a second calculating network forming part of the Kalman estimation member of FIG. 7.

FIG. 12 shows the structure of the calculating network 2090. It consists of a series of multipliers 2551, 2552, 2553 and 2554 which carry out the following operations:

$$a1 \cdot \phi^2 T_i$$
$$b1 \cdot \phi^2 T_i$$
$$c1 \cdot \phi^2 T_i$$
$$d1 \cdot \phi^2 T_i$$

and two adders 2556 and 2557, all providing finally:

$$a = a1 \cdot \phi^2 T_i + r_0$$
$$b = b1 \cdot \phi^2 T_i$$
$$c = c1 \cdot \phi^2 T_i$$
$$d = d1 \cdot \phi^2 T_i + r_0$$

Figure 13:
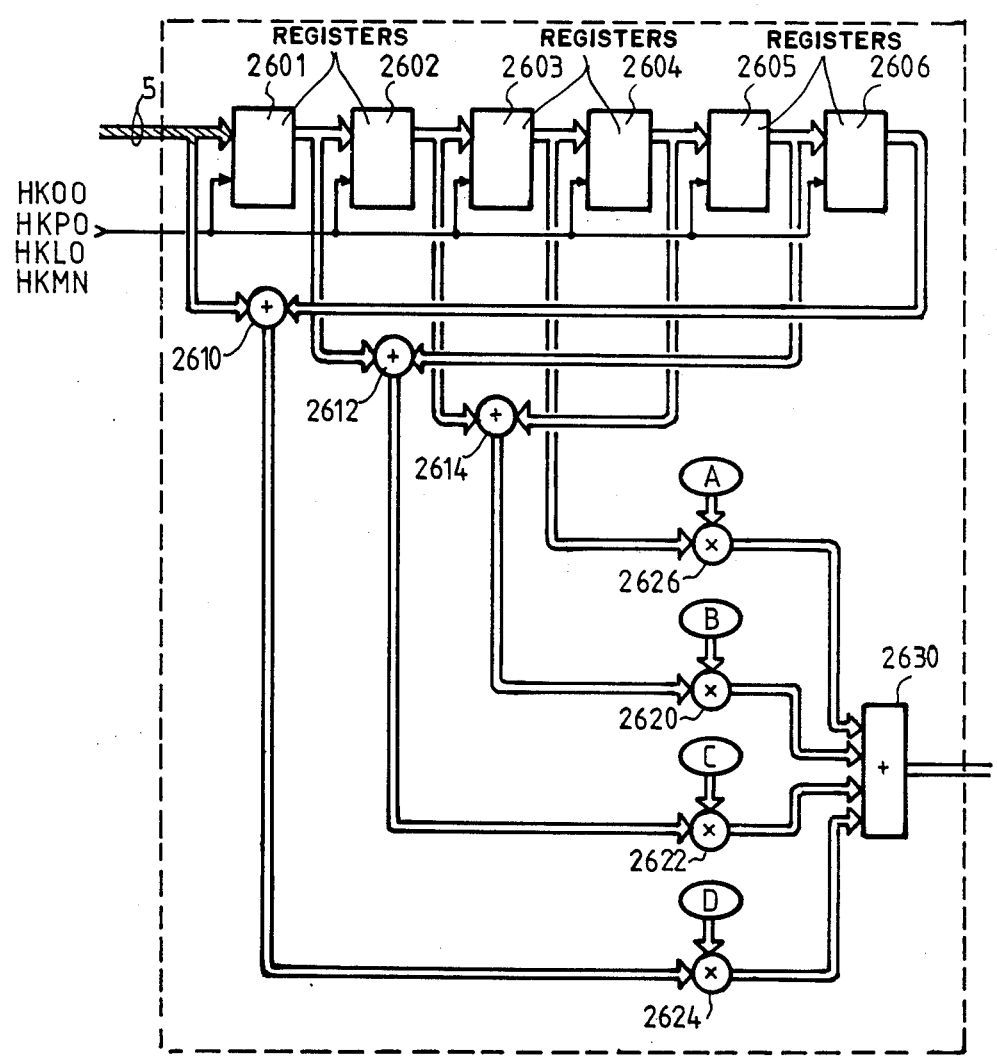
FIG. 13 shows an embodiment of a digital low-pass filter used in the Kalman estimation member shown in FIG. 7.

FIG. 13 shows the structure of the filters 2001, 2002, 2003 and 2004 in greater detail. They consist of six registers 2601, 2602, 2603, 2604, 2605 and 2606 arranged in cascade. Each of these registers is provided with a registering input receiving the signals HKOO, HKPO, HKLO and HKMN, respectively for the filters 2001, 2002, 2003 and 2004. A first adder 2610 produces the sum of the data at the input of the register 2601, and at the output of the register 2606 a second adder 2612 produces the sum of the data at the outputs of the registers 2601 and 2605 and a third adder 2614 produces the sum of the data at the outputs of the registers 2602 and 2604. Subsequently three multipliers 2620, 2622 and 2624 multiply the result of the adders 2614, 2612 and 2610 by coefficients B, C, D, respectively. A fourth multiplier 2626 multiplies the data at the output of the register 2603 by a coefficient A. A final adder produces the sum of all the results provided by the multipliers 2620, 2622, 2624 and 2626 and thus provides the filtering result. The values of these coefficients are A=0.661, B=0.407, C=0.008, D=0.076.

A unidimensional filter has been described. A bidimensional filter, i.e. involving picture elements of preceding lines and of succeeding lines, may also be used without passing beyond the scope of the invention.

The function of the assembly of the members 50, 70, 80 will now be described in greater detail. For this purpose reference is made to FIG. 9.

This function is based on processing cycles which occur between each appearance of the signal HDD incrementing the counter 2025. It is assumed that at the instant t50 the contents of this counter are "adk".

First cycle CYT1. Motion detection; for this purpose the signals HMVN and HMVO are activated at the instants t50 and t51. If the motion is zero the other cycles will develop but without any influence by the switch 2055 which is set to a position.

Processing cycles CYT2, CYT3 and CYT4. The cycle CYT2 begins at the instant t52 with the appearance of the signal HIT and with the appearance of the first parameters $\phi_{Ti}$, $r_0$ to be tested for obtaining the best Kalman filtering. In this example three parameters will be tested, which constitutes the processing cycles CYT2 and thus also CYT3 and CYT4. In each of these cycles which begin with a signal HIT, the signals HKOO, HKPO, HKLO and HKN occurring at the instants t53, t54, t55 and t56 are successively generated for the cycle CYT2. The signal HKQ is generated with the signal HIT at the end of the cycle CYT1, at the instant t58 for systematically registering the first value IFD, whilst the other values are only registered if they are better.

If the motion detector 2000 has detected a motion at the end of the cycle CYT5 after the pulse HIT at the instant t60, it is certain that the register 2075 contains the displacement value which is best estimated by the Kalman filtering and the register 2500 contains the associated value IFD.

Processing cycle CYT5. This cycle begins at the instant t60 and has for its object to compare the error value obtained by the block estimator in blocks. For this purpose the memory 1026 is addressed for obtaining the displacement value. As the signal BC is active during the cycle, the value DB is applied to the register 2075 on the one hand and to the adder 2015 on the other hand; in this respect it will be noted that the value DB is an integral value and that the values dx and dy are thus zero. The value IFD is calculated and in this case it is:

$$IFD = I(Z_i, t) - I[(Z_i - DB(i), t - TR]$$

This calculation is carried out likewise as in the preceding cycles so that at the instant t61 it is certain that the best estimated displacement vector D(i) is found, that is to say:
either the vector O
one of the vectors DK(i) obtained by the different values of $\phi_{Ti}$
or the vector DB(i).

Subsequently, at the instant t62 the pulse HDD occurs, which starts the processing cycles as described hereinbefore.

What is claimed is:

1. An image-processing device for estimating the motion displacement $D(Z_i)$ of objects situated in the image comprising a first estimation member which is an estimation member of a KALMAN filtering member providing for each image point "i" having the coordinates $Z_i$, a displacement vector $DK(Z_i)$ from two successive images $I(Z_i, t)$ and $I(Z_i, t-TR)$ separated by a period TR, a second estimation member for providing a displacement vector $DB(Z_i)$ for each point "i" of the image, a quality measuring member for evaluating the vectors $DK(Z_i)$ and $DB(Z_i)$ and for controlling a vector selector to select that one of the two vectors $DB(Z_i)$ and $DK(Z_i)$ which provides the best estimation for the vector $D(Z_i)$, such that the first estimation member is adapted to receive said vector $D(Z_i)$, wherein means forming part of the Kalman filtering member provide the value $DK(Z_i)$ from predetermined parameters and means providing a value referred to as the innovation IFD so that $$IFD(Z_i) = I(Z_i, t) - I(Z_i - DK(Z_i), t - TR)$$

and said means forming part of the Kalman filtering member further comprises a device for providing a succession of said parameters and the quality measuring member is also adapted to evaluate the minimum value of IFD as a function of the predetermined parameters.

2. An image-processing device for estimating the displacement $D(Z_i)$ of objects situated in said image as claimed in claim 1 further comprising a device for providing a value $IFDB(Z_i) = I(Z_i, t) - I(Z_i - DB(Z_i), t - TR)$ such that this value is utilized as a quality criterion by the quality measuring member, whereby $D(Z_i)$ is taken to be the value of $DB(Z_i)$ or $DK(Z_i)$ which gives the smallest value of $IFD(Z_i)$ or $IFDB(Z_i)$.

3. An image-processing device for estimating the displacement $D(Z_i)$ of objects situated in said image as claimed in claim 1, further comprising a motion detector for providing when there is no motion of objects in the image, a vector $D(Z_i)$ having a value indicating that there is no motion.

4. An image-processing device for estimating the motion displacement $D(Z_i)$ of objects situated in the image comprising a first estimation member providing for each image point "i" having the coordinates $Z_i$, a displacement vector $DK(Z_i)$ from two successive images $I(Z_i, t)$ and $I(Z_i, t-TR)$ separated by a period TR, a second estimation member operating by means of block correlation for providing a displacement vector $DB(Z_i)$ for each point "i" of the image, a quality measuring member for evaluating the vectors $DK(Z_i)$ and $DB(Z_i)$ for controlling a vector selector to select that one of the two vectors $DB(Z_i)$ and $DK(Z_i)$ which provides the best estimation for the vector $D(Z_i)$, such that the first estimation member is adapted to receive said vector $D(Z_i)$, wherein means forming part of a Kalman filtering member provide the value $DK(Z_i)$ from predetermined parameters and means providing a value referred to as the innovation IFD so that $$IFD(Z_i) = I(Z_i, t) - I(Z_i - DK(Z_i), t - TR)$$

and said means forming part of the Kalman filtering member further comprises a device for providing a succession of said parameters and the quality measuring member is also adapted to evaluate the minimum value of IFD as a function of the predetermined parameters.

5. An image-processing device for estimating the displacement $D(Z_i)$ of objects situated in said image as claimed in claim 4, further comprising a motion detector for providing, when there is no motion of objects in the image, a vector $D(Z_i)$ having a value indicating that there is no motion.

6. An image-processing device for estimating the displacement $D(Z_i)$ of objects situated in said image as claimed in claim 4, further comprising a device for providing a value $IFDB(Z_i) = I(Z_i, t) - I(Z_i - DB(Z_i),$ $t-TR$) such that this value is utilized as a quality criterion by the quality measuring member, whereby $D(Z_i)$ is taken to be the value of $DB(Z_i)$ or $DK(Z_i)$ which gives the smallest value of $IFD(Z_i)$ or $IFDB(Z_i)$.

7. An image-processing device for estimating the displacement $D(Z_i)$ of objects situated in said image comprising a first estimation member providing for each image point "i" having the coordinates $Z_i$, a displacement vector $DK(Z_i)$ from two successive images $I(Z_i, t)$ and $I(Z_i, t-TR)$ separated by a period $TR$, a second estimation member for providing a displacement vector $DB(Z_i)$ for each point "i" of the image, a quality mesuring member for evaluating the vectors $DK(Z_i)$ and $DB(Z_i)$ and for controlling a vector selector to select that one of the two vectors $DB(Z_i)$ and $DK(Z_i)$ which provides the best estimation for the vector $D(Z_i)$, such that the first estimation member is adapted to receive said vector $D(Z_i)$, further comprising a motion detector for providing when there is no motion of objects in the image, a vector $D(Z_i)$ having a value indicating that there is no motion, and further comprising a device for providing a value $IFDB(Z_i)=I(Z_i, t)-I(Z_i-DB(Z_i), t-TR)$ such that this value is utilized as a quality criterion by the quality measuring member, whereby $D(Z_i)$ is taken to be the value of $DB(Z_i)$ or $DK(Z_i)$ which gives the smallest value of $IFD(Z_i)$ or $IFDB(Z_i)$.

8. An image-processing device for estimating the displacement $D(Z_i)$ of objects situated in said image comrising a first estimation member which is an estimation member of a KALMAN filtering member providing for each image point "i" having the coordinates $Z_i$, a displacement vector $DK(Z_i)$ from two successive images $I(Z_i, t)$ and $I(Z_i, t-TR)$ separated by a period $TR$, a second estimation member for providing a displacement vector $DB(Z_i)$ for each point "i" of the image, a quality measuring member for evaluating the vectors $DK(Z_i)$ and $DB(Z_i)$ and for controlling a vector selector to select that one of the two vectors $DB(Z_i)$ and $DK(Z_i)$ which provides the best estimation for the vector $D(Z_i)$, such that the first estimation member is adapted to receive said vector $D(Z_i)$, further comprising a device for providing a value $IFDB(Z_i)=I(Z_i, t)-I(Z_i-DB(Z_i), t-TR)$ such that this value is utilized as a quality criterion by the quality measuring member, whereby $D(Z_i)$ is taken to be the value of $DB(Z_i)$ or $DK(Z_i)$ which gives the smallest value of $IFD(Z_i)$ or $IFDB(Z_i)$.

9. An image-processing device for estimating the displacement $D(Z_i)$ of objects situated in said image comprising a first estimation member providing for each image point "i" having the coordinates $Z_i$, a displacement vector $DK(Z_i)$ from two successive images $I(Z_i, t)$ and $I(Z_i, t-TR)$ separated by a period $TR$, a second estimation member operating by means of block correlation for providing a displacement vector $DB(Z_i)$ for each point "i" of the image, a quality measuring member for evaluating the vectors $DK(Z_i)$ and $DB(Z_i)$ and for controlling a vector selector to select that one of the two vectors $DB(Z_i)$ and $DK(Z_i)$ which provides the best estimation for the vector $D(Z_i)$, such that the first estimation member is adapted to receive said vector $D(Z_i)$, further comprising a device for providing a value $IFDB(Z_i)=I(Z_i, t)-I(Z_i-DB(Z_i), t-TR)$ such that this value is utilized as a quality criterion by the quality measuring member, whereby $D(Z_i)$ is taken to be the value of $DB(Z_i)$ or $DK(Z_i)$ which gives the smallest value of $IFD(Z_i)$ or $IFDB(Z_i)$.

* * * * *